United States Patent [19]

Chemay

[11] 4,228,589

[45] Oct. 21, 1980

[54] TAPEMEASURE FOR UNDERWATER USE

[76] Inventor: Theodore L. Chemay, 3132 Birch La., Marrero, La. 70072

[21] Appl. No.: 58,390

[22] Filed: Jul. 18, 1979

[51] Int. Cl.³ .................... G01B 3/10

[52] U.S. Cl. .................... 33/138; 242/84.8

[58] Field of Search .................... 242/84.8, 107, 107.3, 242/107.6, 107.7; 33/138, 414, 139, 140

[56] References Cited

U.S. PATENT DOCUMENTS

| | | | |
|---|---|---|---|
| 2,634,919 | 4/1953 | Strassler | 242/74 |
| 2,749,565 | 6/1956 | Stamm | 242/84.8 X |
| 3,036,791 | 5/1962 | Siggelkov | 242/107 |
| 3,141,628 | 7/1964 | Evans et al. | 242/84.8 |
| 3,716,201 | 2/1973 | West | 242/107 |
| 4,142,693 | 3/1979 | Czerwinski | 242/107 |

FOREIGN PATENT DOCUMENTS

| | | | |
|---|---|---|---|
| 623341 | 7/1961 | Canada | 33/138 |
| 926 | of 1884 | United Kingdom | 33/138 |

*Primary Examiner*—Harry N. Haroian

*Attorney, Agent, or Firm*—John F. McClellan, Sr.

[57] ABSTRACT

An extreme service measuring tape assembly especially adapted for deep sea diving use includes a rugged, easily cleaned and inspected assembly having a split case in which mating peripheral threads and an angled tape slot permit the two halves of the case to be screwed together, the angled tape slot being "L" shaped in one of the case halves with a portion matching a conventional tape slot in the other case half to accommodate the tape in slewed position permitting screwing the case halves together, followed by restored position for use of the tape in measuring; interlocking double spool structure aids guide and positive assembly; compass, magnet, securance, and special polygonal case shape are included in the preferred embodiment.

12 Claims, 5 Drawing Figures

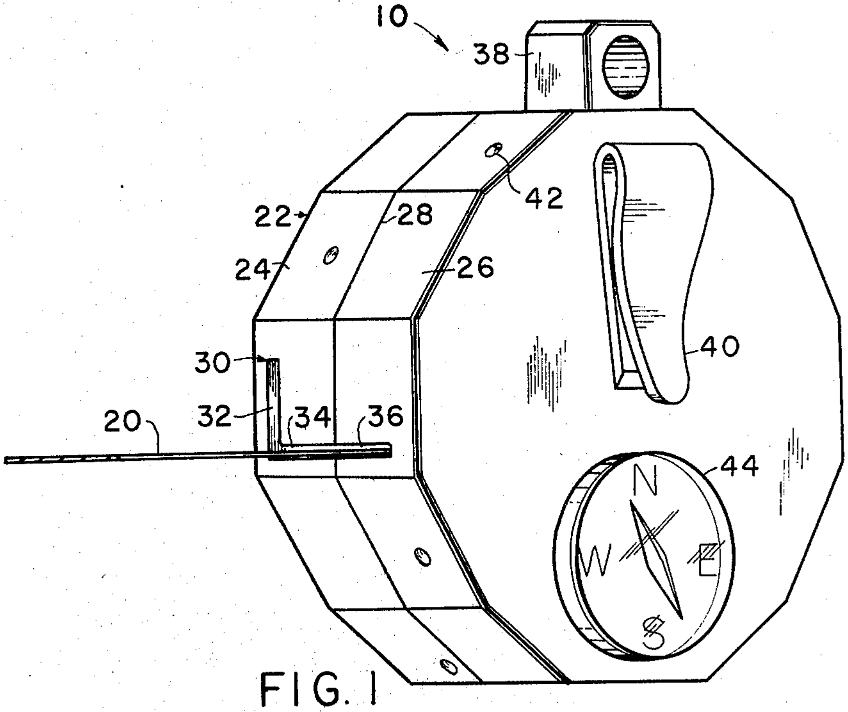
FIG. 1
FIG. 2
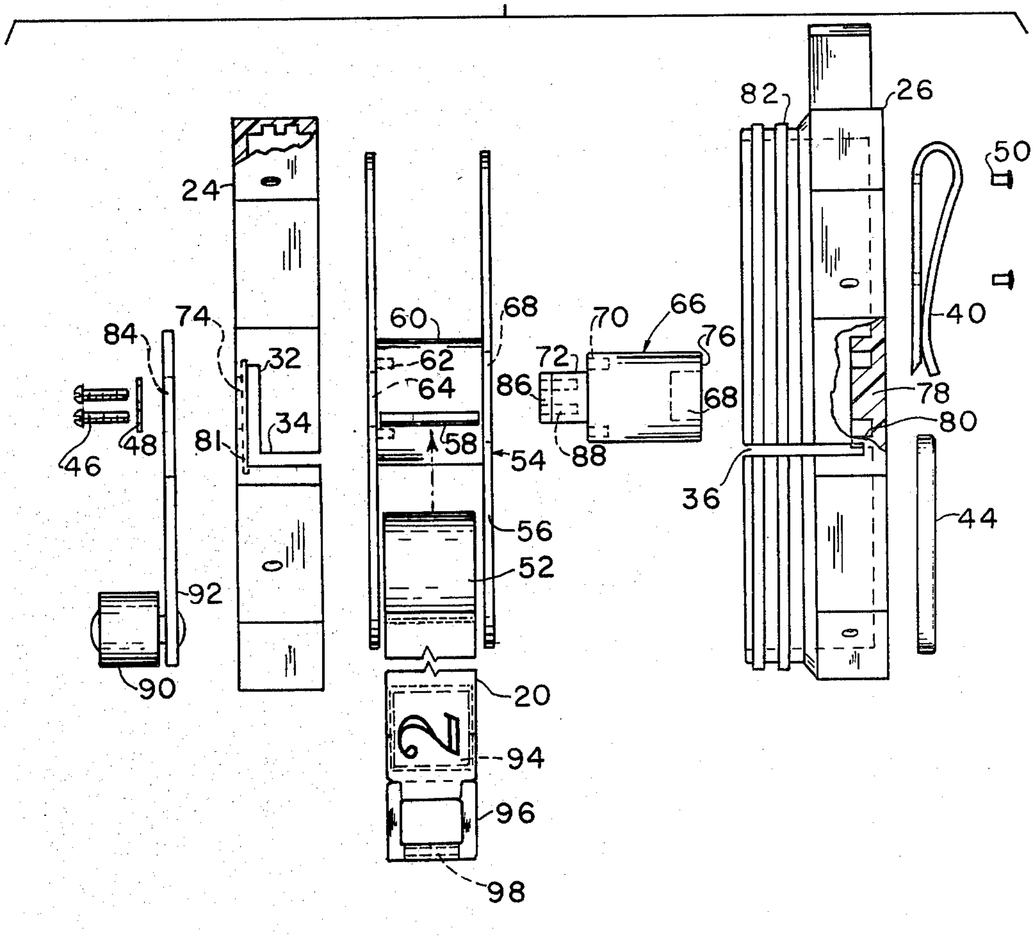

TAPEMEASURE FOR UNDERWATER USE

This invention relates generally to measuring instruments and specifically to reel type measuring tapes.

Among the objects of the present invention is to provide a measuring tape for extremely rough service, in particular deep sea diving use which tends to render conventional tapes unusable after brief service.

As an example, in offshore oil field work a diver's time is very limited. When he gets out of the water and removes his gear he drops most of it on the steel deck between the ladder and the decompression chamber. This happens on almost every dive and conventional measuring tape assemblies cannot take this treatment. Additionally they are hard to clean and to interchange tapes in for any reason.

In the prior art various disclosures of measuring tapes appear, including those of the following U.S. patents:

U.S. Pat. No. 2,634,919 to H. Strassler, 4-14-53, discloses one form of loop securance of a tape;

U.S. Pat. No. 3,036,791 to E. C. Siggelkow, 5-29-62, discloses magnetic holding of tape in position for measurement of objects;

U.S. Pat. No. 3,141,628 to J. J. Evans et al, 7-21-64, discloses another form of loop treatment in a tape, belt clip, casing in two halves with polygonal periphery more or less, and a form of rotatably mounted reel;

U.S. Pat. No. 3,716,201 to Robert F. West, 2-12-73, discloses another form of reel and hub treatment with free hub;

U.S. Pat. No. 4,142,693 to F. G. Czerwinski, 3-6-79 discloses "L" shaped aperture in a spool, and mounting stud and socket structure within a case.

However, the advantages of the present invention as set forth in the objects are believed to have been unavailable prior to this invention; among further advantages are: to provide an instrument as described which is especially reliable, durable and effective for underwater work, which partially disassembles for inspection and cleaning without tools, which has a minimum of small parts, which can be repeatedly dropped on a steel deck without damage, which is especially suitable for production by injection molding, which is low in cost, relatively light in weight, easy to use and attractive in appearance.

In brief summary given for cursive description only and not as limitation the invention includes a measuring tape on a spool in a case split in two transversely to the spool axis and having respective threaded portions peripheral to the spool and a specially shaped opening for the tape, permitting assembly by screwing the threaded portion of the case together.

The above and other objects and advantages of the invention will become more readily understood on examination of the following description, including the drawings in which like reference numerals refer to like parts:

FIG. 1 is a perspective fragmentary view of the invention in use;

FIG. 2 is an exploded view partially in section showing the elements of the invention;

Figure 3:
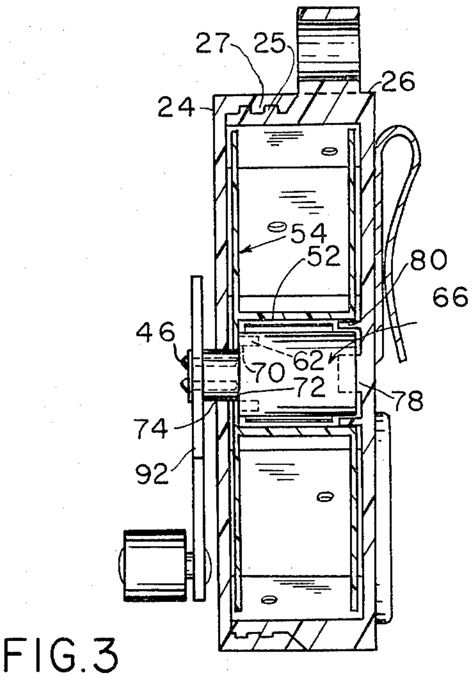
FIG. 3 is a cross sectional view adapted from 3—3, FIG. 1.

FIG. 1 shows the invention 10 in use. Tape 20 (shown fragmentarily) extends from case 22, which is divided into front 24 and back 26. The front and back meet flush at the peripheral seam 28 they form between them. The tape extends through an "L" shaped slot 30 in the case polygonal periphery. The "L" shaped slot includes in the front a vertical slot 32 proportioned for receiving the tape width therealong, angling into horizontal slot 34 and in the back matching continuation 36 of the horizontal slot, together proportioned for receiving the tape width horizontally. Advantages and function of the slot structure are described in reference to the next Figure.

The regular polygonal shape of the case periphery (12 sides preferred) permits clamping the case to structure at almost any angle without being more than 15° (360/12/2) out of alignment, provides a good handgrip, and provides visual and tactile evidence the case halves are screwed together fully.

Other features shown include: at the top of the back integral padeye 38 for fastening the unit by a lanyard to the user, stainless steel spring clip 40 for belt fastening or the like, a plurality of drain holes 42 through the casing and a compass 44, preferably of the fluid filled or pressure-resistant type with luminous letters and needle, and cemented to the back to provide guidance underwater.

FIG. 2 shows the parts of the invention in exploded view. These amount to only seven parts not counting the two handle holding screws 46, washer 48, the two clip holding rivets 50, and the compass 44. The clip and compass are pre-assembled.

In the first assembly step, the tape 20 which has a loop 52 double stitched in the spool-end is thrust (arrow) into spool 54 between the spool flanges 56 through the slot 58 in the cylindrical hub 60 and then opened into loop-shape within, so as to surround the ring of lugs 62 which surround and protrude inwardly from the smaller axial opening 64 in the hub.

The second assembly step is to pass the solid core 66 into the tape loop and into the hub larger axial opening 68 until the matching recesses 70 in it receive the hub lugs and the smaller diameter portion of it 72 protrudes fully through the smaller axial opening 64.

The third assembly step is to capture the just-made sub-assembly between the front 24 and the back 26 so that the second end of the hub or smaller diameter portion 72 passes through the matching axial opening 74 in the front, the concentric annulus 76 of the first end of the hub operatively fits on the axle 78 protruding inwardly from the back 26 and within the stabilizing retainer ring 80 protruding from the back coaxial with the axle.

The fourth assembly step is to twist the protruding tape 20 so that it fits in the vertical slot 32 of the "L" shaped slot in the front to hold it free of the back 26 in the next step, and the thickness is receivable in recess 81 as explained in step six below.

The fifth assembly step is to screw the front and back together until they stop, the relation of the threads being made such that the back threaded portion 82 screws all the way in against the front; at this point the horizontal portion 34 of the "L" shaped slot in the front aligns with the horizontal slot 36 in the back, to pass the tape.

The sixth assembly step is to twist the tape into the horizontal slot, ready for reeling in. Recess 81 in the inside front wall of the front half of the case along the vertical part of the slot provides room for this while permitting the case halves to abut fully together. The seventh assembly step is to attach the handle by slipping the oblong opening 84 in the handle over the matching flattened part 86 of the protruding smaller diameter portion, and draw it home against the shoulder using the two screws 46 passed through washer 48, the handle, and into the tapped holes 88 in the end of the smaller diameter portion of the solid core. Preferably brass inserts are fixed in this element and tapped for the screws.

The assembly is now ready for use, and the tape may be reeled in by grasping the freely spindled knob 90 and rotating the spool by the handle 92 which preferably is of brass.

Other tape features visible in this view are the square magnet 94 sewn or otherwise secured adjacent the end of the tape to permit measuring steel pipes and the like which have no structure to which the tape can be attached.

For conventional attachment a square metal loop 96 is provided in the end of the tape. For right-angle hooking to an object a conventional right-angle fold-out 98 of the square metal loop is also provided.

Preferably the tape numerals are luminous and as large as the width of the tape permits. The tape may be of Nylon webbing and is one-inch wide preferably.

FIG. 3 diagrams the assembled relations of the elements of the invention

Screw threads 25, 27 in the front 24 and back 26 in a location peripheral to but not necessarily radial of the spool connect the front and back. As noted, the tape loop 52 secures over the solid core 66 which mounts rotatably to the back 26 by engagement of axle 78 on the axis and safety back-up concentric ring 80 supportively around it on the back, and to the front by passage of the smaller diameter end 72 through hole 74 which journals it and supports it under the load of crank 92. Thrust load at the front end is taken by the spool 54 which engages the front, and which is rotationally coupled with the solid core 66 by means of the lugs 62 projecting from it into the matching recesses 70 in the solid core. Screws 46 hold the crank 92 secured by the squared hole in it on the similarly contoured portion of the smaller diameter end of the solid core.

Figure 4:
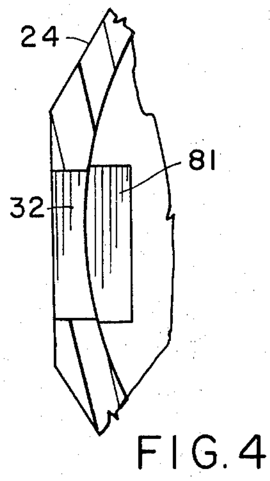
FIG. 4 is a larger scale detail adjacent the tape slot.

FIG. 4 shows a further detail of the relief 81 or recess in the inner surface of the front along the vertical slot 32 and extending slightly above and below it, to provide clearance for the tape when in the vertical slot. Recess depth is preferably slightly greater than the tape thickness and length slightly greater than the slot length.

Figure 5:
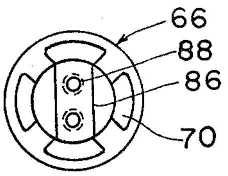
FIG. 5 is a larger scale axial view detail.

FIG. 5 shows in end view a preferred arrangement of the recesses 70, to receive the similarly shaped lugs in the hub in the end of the smaller diameter portion of the solid core, shows the flats 86 shaping the end of the core to engage the similarly shaped hole in the handle, and shows the threaded holes 88 for the handle retaining screws.

From the above it can be seen that the invention can easily be constructed of any of any impact resistant, tough, durable plastic such as polystyrene, at very low cost per unit, the material advantageously being a bright orange, preferably flourescent, that the user, regardless of where he uses the invention, will find it to operate reliably over a long life, easy to use, and easy to strip down partially for cleaning without tools or entirely, for tape interchange. The tape itself can be of standard woven Nylon or equivalent.

Some dimensions in the preferred embodiment are:

tape width 1 inch (2.5 cm) as noted;

tape loop 1 inch in diameter and double stitched;

square loop or clip at end of tape 1 inch (2.5 cm) square; by ⅛ inch (0.3 cm) wide material by 1/16 inch (0.15 cm)

spool 1/16 inch thick walls;

axial opening in back side of spool 1⅛ inch; (2.8 cm) diameter and in front side of spool 9/16 inch (1.4 cm);

hub slot ⅛ inch (0.3 cm) by 1 1/16 inch (2.7 cm);

solid core axial opening 7/16 inch (1.1 cm) by 3/16 inch (0.5 cm) deep;

handle ⅛ inch (0.3 cm) thick;

case thickness 1/16 inch (0.15 cm).

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. In a measuring tape assembly with an extensible and retractable tape mounted on a spool in a case divided transverse to the spool axis into two parts and having a peripheral portion around the spool with structure defining an opening for passage of the tape, and means for winding the spool, the improvement comprising: the two case parts including a front and a back with integral means detachably joining the front and back, the detachably-joining means including the front and back each having a respective screw thread around said peripheral portion; and said structure defining the tape opening in the form of an "L" shaped slot with a horizontal portion extending across said front and back for holding the width of the tape partly in said front and partly in said back and with a vertical portion in said front for receiving the tape width vertically therealong for clearing the tape from said back and permitting said front and back to be rotated relative to each other on said screw threads for assembly and disassembly of said measuring tape assembly.

2. In a measuring tape assembly with the tape mounted on a spool in a case divided transverse to the spool axis into two parts and having a peripheral portion around the spool with structure defining an opening for the tape, and means for winding the spool, the improvement comprising: the two case parts including a front and a back with integral means detachably joining the front and back, the integral detachably joining means including the front and back each having a respective screw thread around said peripheral portion, said structure defining the tape opening in the form of an "L" shaped slot, the "L" shaped slot including an "L" shaped portion in the front with a part thereof vertical and proportioned for receiving the tape width therealong, and said structure defining a horizontal portion of the "L" shaped slot in the back.

3. In a measuring tape assembly as recited in claim 2, said structure further defining a recess in the front along the vertical part of the slot proportioned for receiving the thickness of the tape therein.

4. In a measuring tape assembly as recited in claim 3, the case having a uniformly polygonal peripheral shape.

5. In a measuring tape assembly as recited in claim 4, said peripheral shape having twelve sides.

6. In a measuring tape assembly as recited in claim 3, a padeye integrally projecting from a portion of the case.

7. In a measuring tape assembly as recited in claim 1, the spool having a hub, a core having detachable mounting within the hub, the tape proportioned for passing through an opening in the hub and having a loop for surrounding the core for affixation to the measuring tape assembly, means rotatably supporting the core including the core having at a first end thereof an axial annulus, and the back having projecting therefrom an axle for supportively extending into the axial annulus and a coaxial ring for supportivelly surrounding the axial annulus.

8. In a measuring tape as recited in claim 7, the core having at a second end thereof a smaller diameter portion for rotatable support by an opening in the front, lug-receiving structure in the core around the smaller diameter portion, and the spool having lug structure engaging the lug receiving structure for rotational drive by the core.

9. In a measuring tape assembly as recited in claim 8, the smaller diameter end of the core having flat structure for engaging a matching hole in the means for winding and being driven by the means for winding.

10. In a measuring tape assembly as recited in claim 9, the case having a plurality of drain holes therein.

11. In a measuring tape assembly as recited in claim 9, a compass on the back.

12. In a measuring tape assembly as recited in claim 11, a carrying clip on the back above the compass.

* * * * *